United States Patent [19]

Okumura

[11] 4,274,265

[45] Jun. 23, 1981

[54] METHOD AND APPARATUS FOR AUTOMATICALLY OPERATING CAR-MOUNTED AIR-CONDITIONER

[75] Inventor: Shunji Okumura, Aichi, Japan

[73] Assignee: Nippondenso Co., Ltd., Kariya, Japan

[21] Appl. No.: 52,923

[22] Filed: Jun. 28, 1979

[30] Foreign Application Priority Data

Aug. 4, 1978 [JP] Japan .................................. 53/95718

[51] Int. Cl.³ ...................... G05D 23/32; F25B 19/00; B60H 3/04
[52] U.S. Cl. ........................................ 62/158; 62/231; 62/244; 290/38 C; 290/DIG. 10; 237/12.3 C
[58] Field of Search ................ 62/157, 231, 244, 158; 180/287, 289; 290/DIG. 1, DIG. 3, DIG. 10, 38 C, 38 E; 237/12.3 C

[56] References Cited

U.S. PATENT DOCUMENTS

| | | |
|---|---|---|
| 2,748,759 | 6/1956 | Schiffer .............................. 290/38 C |
| 2,781,642 | 2/1957 | Jacobs ..................................... 62/157 |
| 3,009,067 | 11/1961 | Janeczko et al. .................. 290/38 C |
| 3,844,130 | 10/1974 | Wahnish ............................ 62/244 X |
| 3,942,718 | 3/1976 | Palmieri ................................. 165/26 |
| 4,156,502 | 5/1979 | Day .................................... 236/46 R |

*Primary Examiner*—William E. Wayner
*Assistant Examiner*—Harry Tanner
*Attorney, Agent, or Firm*—Cushman, Darby & Cushman

[57] ABSTRACT

In a car-mounted air-conditioner driven by a mechanical power source provided on a car and capable of starting the operation for cooling or warming the air in the car room or cabin at a preset time under the control of a microcomputer, the microcomputer is interrupted at the preset time to be caused to compare the air temperature of the car room with a preset temperature and only when the air temperature is found to be outside a suitable temperature range, the microcomputer actuates the mechanical power source to start the operation of the air-conditioner.

8 Claims, 6 Drawing Figures

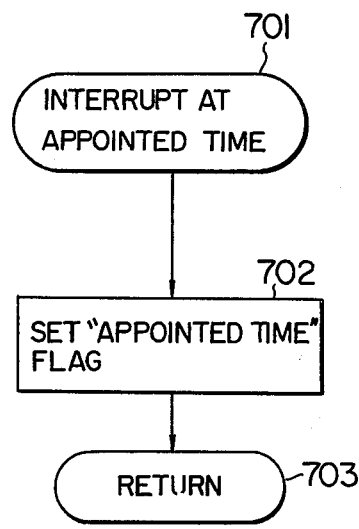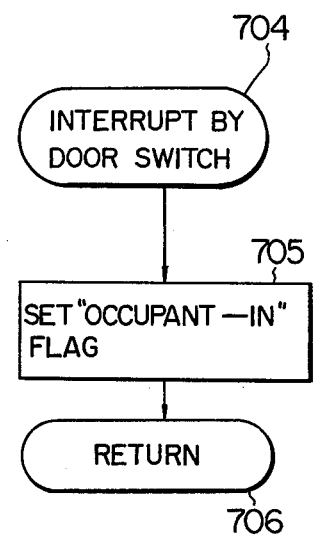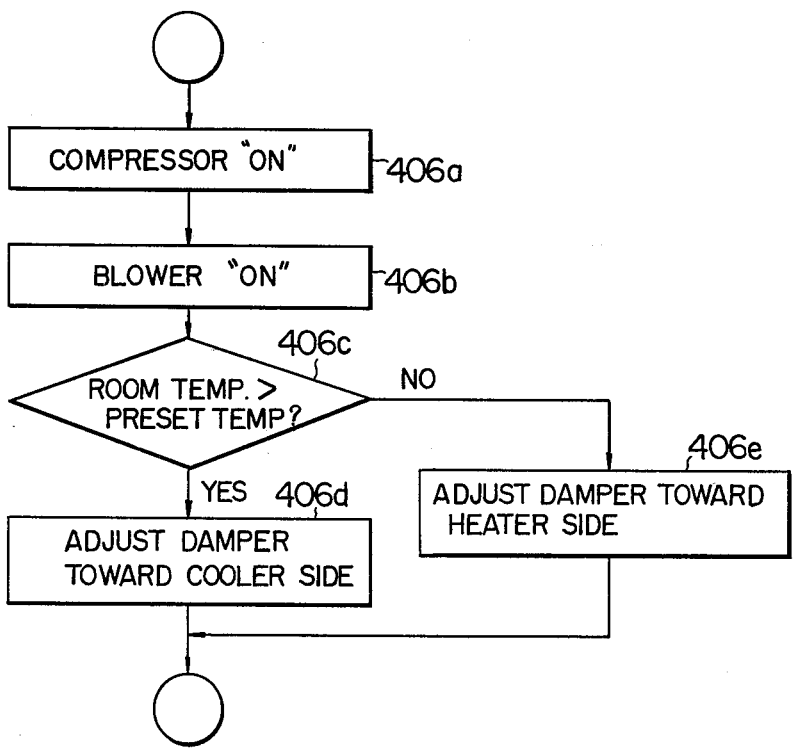

METHOD AND APPARATUS FOR AUTOMATICALLY OPERATING CAR-MOUNTED AIR-CONDITIONER

BACKGROUND OF THE INVENTION

This invention relates to a method and an apparatus for automatically starting the operation of a car-mounted air-conditioner capable of cooling or warming the air in the car room or cabin of a vehicle such as an automobile.

The conventional means for automatically controlling the warming-up of the engine of a car by a timer are disclosed in, for example, the Japanese Patent Laid-Open No. 107333/75 titled "An apparatus for automatically starting the engine of a car", the Japanese Patent Laid-Open No. 115019/77 titled "An automatic warming-up apparatus for a car", etc.

Each of the above cited apparatuses causes the engine to be automatically started at a preset time set in a timer so as to warm up the engine. Accordingly, if the air-conditioner is so designed or set as to be started in response to the start of the engine, the air-conditioner will be automatically operated even where the air temperature in the car room is within a suitable temperature range relative to a predetermined temperature, that is, where neither cooling nor warming is necessary.

SUMMARY OF THE INVENTION

The object of this invention, which has been made to eliminate such a problem as described above, is to provide a method for automatically operating a car-mounted air-conditioner according to which method the automatic operation of the air-conditioner is so controlled as to prevent the unnecessary operation thereof on the basis of a preset time and the air temperature of the car room, and also to provide an apparatus for properly embodying the method.

In order to attain the above object, the following steps are taken in accordance with this invention. Namely, the air-conditioner is designed to be driven by a mechanical power source mounted on the car and capable of cooling or warming the air in the car room; whether or not the temperature of the air in the car room is within a suitable temperature range relative to a preset temperature, is checked when the time associated with a predetermined time is detected; and if the room temperature is outside the range, the operation of the mechanical power source is started and simultaneously the operation of the air-conditioner is also started.

Other features and advantages of the present invention will be apparent from the following description taken in conjunction with the accompanying drawings in which:

BRIEF DESCRIPTION OF THE DRAWINGS

FIG. 4 shows the flow chart of an interrupt processing at a preset instant of time;

FIG. 5 shows the flow chart of an arithmetic processing as a detail of the easy air-conditioning step shown in FIG. 2; and FIG. 6 shows the flow chart of a door switch interrupt.

DESCRIPTION OF THE PREFERRED EMBODIMENTS

This invention will now be described by way of embodiment with the aid of the attached drawings.

Figure 1:
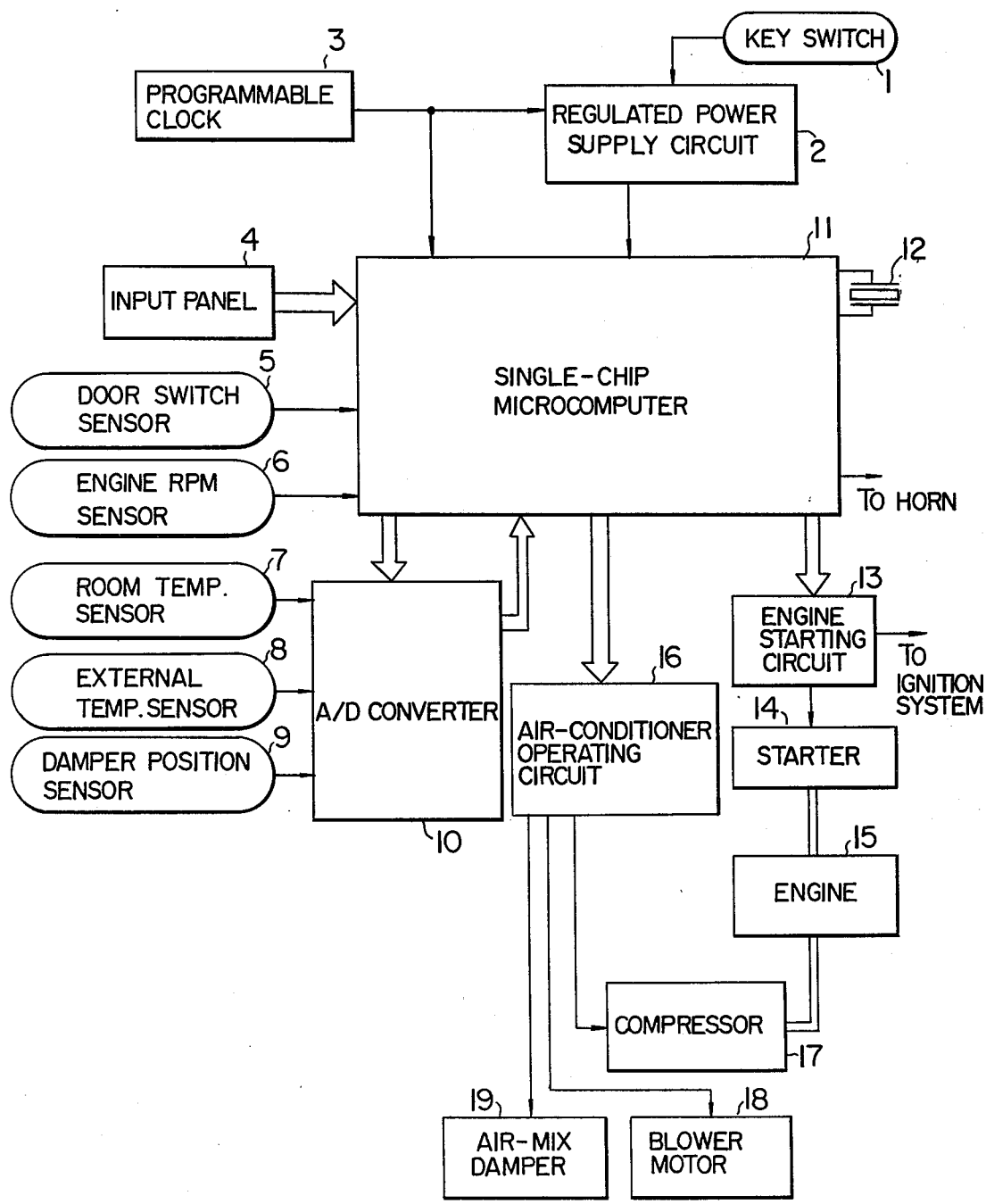
FIG 1. shows in block diagram an apparatus for automatically operating a car-mounted air-conditioner as one embodiment of this invention.

FIG. 1 shows in block diagram the whole constitution of an embodiment of this invention, in which a reference numeral 1 indicates a key switch of a car; 2 a stabilized voltage source or a regulated power supply circuit for delivering a stabilized voltage of 5 V on being fed by the supply voltage of 12 V of a battery (not shown) mounted on the car in response to the closure of the key switch or the reception of a start signal; 3 a programmable clock in which any desired time can be set and which is operated, independent of the operation of the key switch, by being always fed by the car-mounted battery so that it may deliver a start signal when the preset start time is reached; 4 an input panel for selecting the operating modes of the air-conditioner mounted on the car and for previously setting a desired temperature at which the room temperature of the car is to be kept; 5 a door switch sensor for delivering a door signal when a door of the car is opened; 6 a revolution sensor for detecting the rpm of an engine 15 and for delivering rotation pulses in time with the revolutions of the engine; 7 a temperature sensor for detecting the temperature in the car room; 8 a temperature sensor for detecting the temperature of the surrounding air outside the car; 9 a damper position sensor for performing a feedback control by detecting the valve (or needle) position of an air-mix damper 19 serving to control the room temperature; and 10 an analog/digital (or A/D) converter for converting analog signals to the corresponding digital signals, i.e., for converting the analog outputs of the room temperature sensor 7, the external temperature sensor 8 and the damper position sensor to the corresponding digital signals.

A single-chip microcomputer 11 is used as an arithmetic processing means for executing the digital processing of the software in accordance with the control program including the predetermined control of the car-mounted air-conditioner. The microcomputer 11 is operated by being connected with a crystal oscillator 12 having an oscillation frequency of several megahertz as well as by being supplied with the 5 V stabilized voltage from the regulated power supply circuit 2, and delivers, as a result of its arithmetic processing, various command signals for controlling the operations of the engine and the air-conditioner and the actuation of a horn.

The microcomputer has its main part fabricated as a large-scale integrated circuit formed in a single chip, comprising a read only memory ROM which stores the control programs including the air-conditioner control program defining the arithmetic procedure for generating the above mentioned command signals; a central processing unit CPU which serves to read out the control programs stored in the ROM and to execute the arithmetic processings corresponding to the control programs; a random access memory RAM which serves to temporarily store data necessary for the arithmetic processing by the CPU and therefore capable of being read out by the CPU; a clock generating circuit for generating reference clock signals used for the execution of the various arithmetic processings on the basis of the oscillation of the crystal oscillator 12; and an input-/output (or I/O) circuit including input/output terminals, for adjusting the input and the output of the signals. The microcomputer 11 therefore generates, as a result of the processings according to the air-conditioner control program, a start command signal, a start release command signal, an air-conditioning start command signal, an air-conditioning stop command signal, an engine stop command signal, an air-conditioning adjustment command signal and a warming signal for actuating the horn so that the operations of the engine and the air-conditioner may be controlled.

An engine starting circuit 13 causes the engine 15 as a mechanical power source to be started by a starter 14 in response to the start command signal from the microcomputer 11, the starter 14 to stop its operation in response to the start release command signal, and the ignition system to be deenergized in response to the engine stop signal so as to stop the engine 15. An air-conditioner operating circuit 16 receives the air-conditioning start command signal from the microcomputer 11, turns on the electromagnetic clutch of a compressor 17 to start the operation of the compressor 17, rotates a blower motor 18, and starts the adjustment of an air-mix damper 19. The compressor 17 is mechanically coupled to the engine 15 so as to be operated by a fraction of its torque, whereby the coolant is compressed and caused to circulate to perform air-cooling. The blower motor 18 supplies air into the car room when it is rotated. The air to be supplied as forced drafts by the blower motor 18 is partially cooled and partially warmed and the ratio of the flow rate of the warmed air to the flow rate of the cooled air is controlled by the air-mix damper 19. Thus, the air-conditioning of the car room is performed by supplying the controlled mixture of the cooled air and the warmed air into the car room.

Next, the operation of the system as described above and shown in FIG. 1 will be explained with the aid of the flow charts shown in FIGS. 2 to 6.

Figure 2:
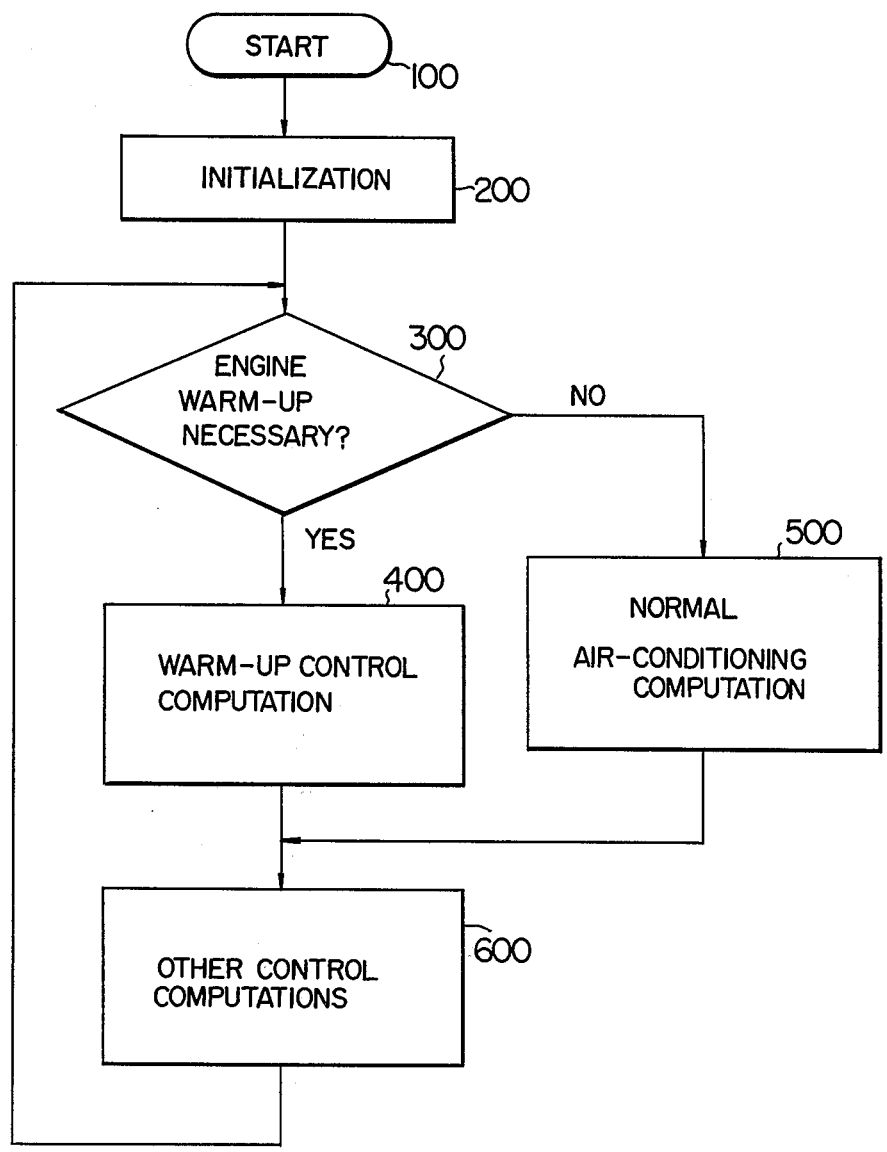
FIG. 2 shows the flow chart of the entire arithmetic processing according to the control programs defined in the microcomputer shown in FIG. 1.
Figure 3:
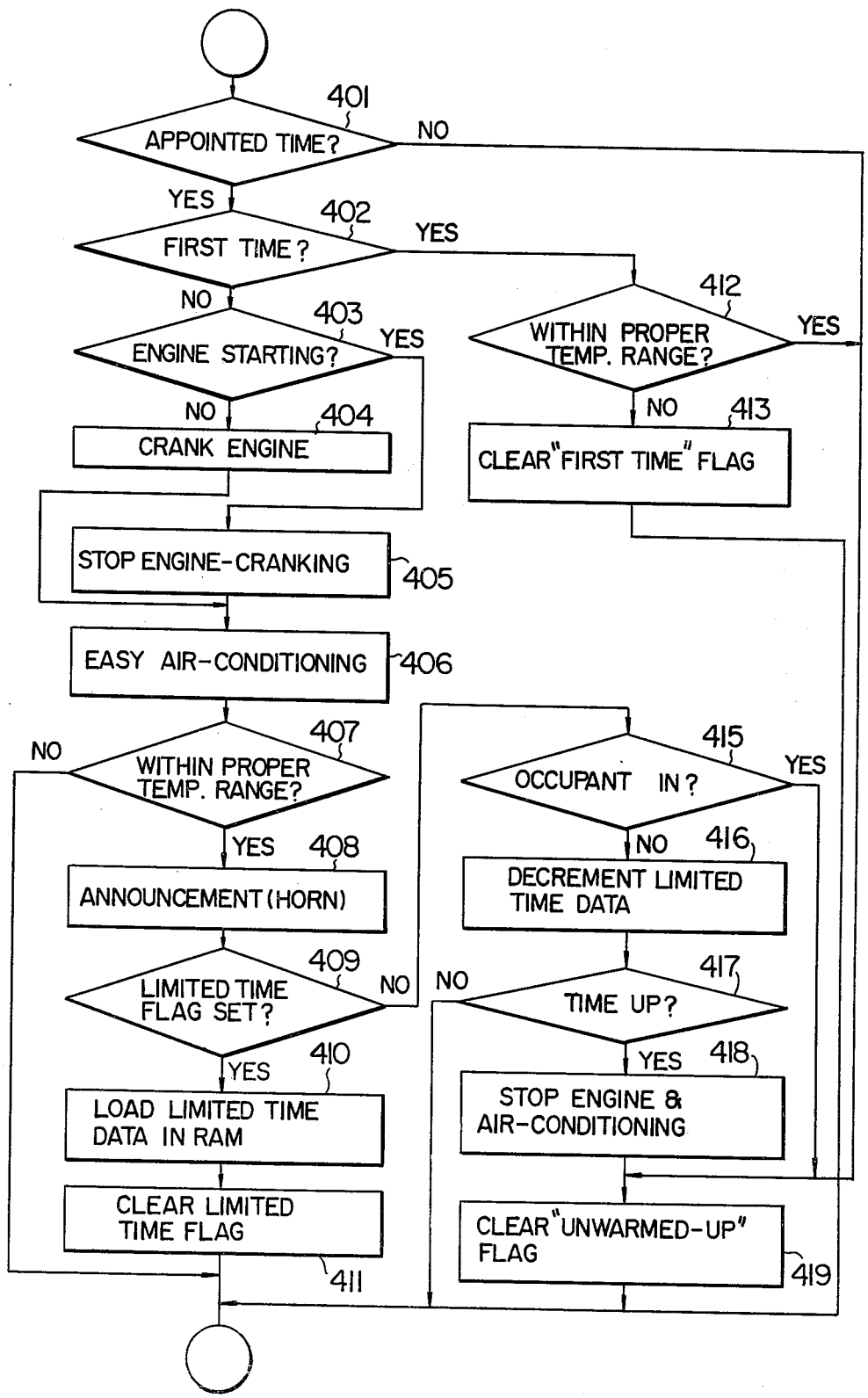
FIG. 3 shows the flow chart of an arithmetic processing as a detail of the warming-up control routine shown in FIG. 2.

FIG. 2 shows the flow chart of the whole arithmetic processings according to the control programs defined in the microcomputer 11, FIG. 3 shows the flow chart of an arithmetic processing as the detail of the warming-up control routine shown in FIG. 2, FIG. 4 shows the flow chart of an interrupt processing at a preset instant of time, FIG. 5 shows the flow chart of an arithmetic processing as a detail of the easy air-conditioning step shown in FIG. 2, and FIG. 6 shows the flow chart of a door switch interrupt.

The arithmetic processing by the microcomputer 11 will first be described. Let a car furnished with such a microcomputer be taken as an example, which is schematically represented by the diagram in FIG. 1. When the key switch 1 is turned on, the regulated power supply circuit 2 supplies a stabilized voltage to the microcomputer 11 so that the microcomputer 11 is operated to execute the processings of the control programs at a period of about several hundreds of milliseconds.

Namely, when the key switch 1 is turned on, the arithmetic processing starts with a start step 100 shown in FIG. 2. Then, an initialization routine 200 follows to set the registers, the counters, the latches etc. of the microcomputer 11 in the initial states required for the start of the arithmetic processing. In this initialization 65 various flags allocated to, for example, the specific addresses or bits of a register or the RAM are set or cleared. In other words, the "appointed time" flag indicating that the programmable clock 3 has reached an appointed time, is cleared; the "first time" flag indicating the first arithmetic processing at the appointed time is set; the "limited time" flag for loading limited time data in the RAM is set, and the "unwarmed-up" flag indicating the warming-up of the engine is set. This initialization routine 200 is followed by a warming-up checking step 300. The result of the check by the step 300 takes the YES route on the basis of the operation of setting the "unwarmed-up" flag in the initialization routine 200 and a warming-up control routine 400 follows the step 300. In the warming-up control routine 400, an appointed time checking step 401 shown in FIG. 3 is first reached to check whether the "appointed time" flag is set or not. Since in this case the "appointed time" flag is not set because of the start of the operation by the turn-on of the key switch 1, the result of the check in the step 401 causes the NO route to be taken so that an "unwarmed-up" flag clearing step 419 is reached. In the "unwarmed-up" flag clearing step 419, the "unwarmed-up" flag and the "appointed time" flag are both cleared and after the following other controls routine 600 has been finished, the warming-up checking step 300 is resumed. In the other controls routine 600, arithmetic processings for the controls of the various car-mounted systems except the air-conditioner which use the outputs of, for example, the external temperature sensor 8 etc. are executed to generate signals for commanding the controls of the systems. Now, the warming-up checking step 300 selects the NO route since the "unwarmed-up" flag has been cleared in the "unwarmed-up" flag clearing step 419. As a result, a normal air-conditioning routine 500 is reached. In the normal air-conditioning routine 500, through the operation of the air-conditioner operating circuit 16 in FIG. 1, the compressor 17 is turned on and off, the speed of the blower motor 18 is controlled and the position adjustment of the air-mix damper 19 is performed, whereby the car room is properly air-conditioned. The stream of the arithmetic processing proceeds via the normal air-conditioning routine 500 to the other controls routine 600 and thereafter returns to the warming-up checking step 300. The loop of the arithmetic processing starting with the warming-up checking step 300, passing through the normal air-conditioning routine 500 and the other controls routine 600 and returning again to the warming-up checking step 300, is thereafter repeated at a period of several hundreds of milliseconds.

If the key switch 1 is turned off while the car is at rest, the regulated power supply circuit 2 is shut off to interrupt the supply of the stabilized voltage. Accordingly, the microcomputer 11 stops its operation to bring the compressor 17, the blower motor 18 and the air-mix damper 19 to a halt.

In this state, the appointed time for the car to be driven next is set in the programmable clock 3 to prepare the air-conditioner for automatic operation. When the appointed time is reached, the programmable clock 3 delivers a start signal first to the regulated power supply circuit 2 and the microcomputer 11. As a result, the circuit 2 is actuated to supply its stabilized voltage to the microcomputer 11, which is in turn energized to start its operation with the start step 100 shown in FIG. 2 followed by the initialization routine 200 for setting various initial values.

The completion of the initialization routine 200 allows interrupts to occur and since the start signal from the programmable clock 3 is being applied to the interrupt request input terminal of the microcomputer 11, an interrupt occurs to interrupt the arithmetic processing following the initialization routine 200. The stream of the processing then jumps to an appointed time interrupt step 701 shown in FIG. 4. The appointed time interrupt step 701 is followed by an "appointed time" flag setting step 702 in which an "appointed time" flag is set. This appointed time setting routine shown in FIG. 4 finishes with a return step 703 following the "appointed time" flag setting step 702. Then, the above interrupted processing is resumed, that is, the microcomputer 11 starts the warming-up checking step 300. Since at this time the "unwarmed-up" flag is set in the previous initialization routine 200, the result of checking by this step 300 is "YES" so that the processing proceeds to a warming-up control routine 400. The warming-up control routine 400 begins with an appointed time checking step 401 shown in FIG. 3, in which whether an "appointed time" flag has been set or not is checked. Since the "appointed time" flag has been set as a result of the previous processing in the appointed time interrupt routine shown in FIG. 4, the result of checking in this step 401 is "YES" so that a first time checking step 402 is reached. In the first time checking step 402 is checked whether a "first time" flag has been set or not. Since the "first time" flag has been set in the initialization routine 200, the result of checking in this step 402 is "YES" so that a proper temperature range checking step 412 is reached.

Since the temperature of the air in the car room is usually much different from the preset temperature defined by an input manipulator on the input panel 4 especially in summer or winter, the result of checking in the proper temperature range checking step 412 is "NO". Accordingly, a "first time" flag clearing step 413 is reached to clear the "first time" flag so that a single processing in the warming-up control routine 400 is finished. This routine 400 is followed by the other system controls routine 600. And after the routine 600 has been finished, the warming-up checking step 300 is resumed. At this time, since the "unwarmed-up" flag is still set, the result of checking in the step 300 becomes "YES" so that the warming-up control routine 400 is reached. The warming-up control routine 400 starts with the appointed time checking step 401 shown in FIG. 3. The result of checking in this step 401 is "YES" as in the previous step 300 so that the "first time" checking step 402 is reached. Since the "first time" flag has already cleared in the "first time" flag clearing step 413 executed before, the result of checking in the first time checking step 402 is changed from "YES" to "NO". Accordingly, an engine start checking step 403 follows next, but since the engine has not yet been started, the revolution sensor 6 delivers no pulse. The result of checking in the engine start checking step 403 is "NO" so that an engine cranking step 404 is reached to supply a start command signal to the engine starting circuit 13. The start command signal is held in the engine starting circuit 13 and the circuit 13 in turn actuates the starter 14 to start the operation of the engine 15. The result of checking in the step 403 continues to be "NO" before the revolution of the engine 15 reaches a predetermined rpm value.

Now, an easy air-conditioning control step 406 sets in, which starts with a compressor "on" substep 406a in which a compressor "on" signal is applied to the air-conditioner operating circuit 16. The compressor "on" substep 406a is followed by a blower "on" substep 406b where a blower "on" signal is applied also to the air-conditioner operating circuit 16. As a result, the air-conditioner operating circuit 16 holds the compressor and the blower "on" signals to cause the compressor 17 to start its operation and the blower motor 18 to start at a medium speed. The blower "on" substep 406b is followed by a temperature checking substep 406c in which whether or not the room temperature detected by the room temperature sensor 7 is higher than the preset temperatures set by the input manipulator on the input panel 4, is checked. In summer when temperature is kept relatively high, for example, the result of checking in the substep 406c is "YES" so that a substep 406d for adjusting the air-mix damper 19 toward the cooler side is reached, in which an adjusting signal for adjusting the air-mix damper 19 toward the cooler side is supplied to the air-conditioner operating circuit 16. On the other hand, in winter, for example, when air temperature is relatively low, the result of checking in the temperature checking substep 406c is "NO" so that a substep 406e for adjusting the air-mix damper 19 toward the heater side is reached, in which an adjusting signal for adjusting the air-mix damper 19 toward the heater side is supplied to the air-conditioner operating circuit 16.

After the easy air-conditioning control step 406 follows the proper temperature range checking step 407. Since the engine is now starting and since air-conditioning has not yet been completed, the result of checking in the step 407 is "NO" so that the warming-up control routine 400 is finished. Then, the other system controls routine 600 sets in and after the completion of the routine 600 the warming-up checking step 300 is resumed.

Thereafter, until the completion of the starting of the engine 15, the arithmetic processing loop: the warming-up checking step 300→the appointed time checking step 401→the first time checking step 402→the engine start checking step 403→the engine cranking step 404→the easy air-conditioning control step 406→the proper temperature range checking step 407→the other system controls routine 600→the warming-up checking step 300, is repeated. When the engine starting operation is completed as a result of the repeated processing, that is, when the rpm of the engine reaches a predetermined value, the result of checking in the engine start checking step 403 is changed from "NO" to "YES" so that an engine-cranking stopping step 405 is reached. In the engine-cranking stopping step 405, the start command signal held in the engine starting circuit 13 is released to stop the operation of the starter 14. The processing proceeds therefore from the easy air-conditioning control step 406 through the proper temperature range checking step 407 and the other system controls routine 600 back to the warming-up checking step 300.

Thereafter, the processing loop: warming-up checking step 300→warming-up control routine 400 consisting of the appointed time checking step 401, the first time checking step 402, the engine start checking step 403, the engine-cranking stopping step 405, the easy air-conditioning control step 406 and the proper temperature range checking step 407→other system controls routine 600→warming-up checking step 300, is repeated. As a result of this repeated processing, the idling of the engine is controlled and a fraction of the idling torque actuates the compressor 17 for compressing the coolant while the air to be supplied into the car room is heated by the heat stored in the cooling water to prevent overheating of the engine.

Consequently, the room temperature is so controlled as to approach the preset temperature and when it gets in the proper temperature range (in which it differs from the preset temperature by not more than a predetermined value), the result of checking in the proper temperature range checking step 407 is changed from "NO" to "YES" so that an announcement step 408 is reached. In the announcement step 408, the car-mounted horn is energized to inform the driver who may be away from the car that the room temperature is now within the proper temperature range. The step 408 is followed by a "limited time" flag checking step 409. In the "limited time" flag checking step 409 is checked whether a "limited time" flag has been set or not. Since the "limited time" flag has been set in the initialization routine 200, the result of checking in the step 409 is "YES" so that a limited time loading step 410 is reached to store limited time data representing 3 minutes in the memory location having a particular address in, for example, the RAM. Then, the "limited time" flag is cleared in a "limited time" flag clearing step 411 which terminates the warming-up control routine 400. The processing now returns again to the warming-up checking step 300 via the other system controls routine 600.

Next, when the warming-up control routine 400 succeeded the warming-up checking step 300, there follow a series of the steps: the appointed time checking step 401, the first time checking step 402, the engine start checking step 403, the engine-cranking stopping step 405, the easy air-conditioning control step 406, the proper temperature range checking step 407, the announcement step 408 and the "limited time" flag checking step 409. Since the "limited time" flag has been cleared in the "limited time" flag clearing step 411 in the previous processing cycle, the result of checking in the "limited time" flag checking step 409 is changed from "YES" to "NO" so that an occupant checking step 415 is reached.

When there is no occupant in the car room, no "occupant-in" flag is set so that the result of checking in the occupant checking step 415 is "NO". Accordingly, a limited time data decreasing step 416 is reached where a constant value of several hundreds of milliseconds equal to a cycle of the repeated processing is subtracted from the limited time data representing 3 minutes and set in the limited time data loading step 410. The limited time data decreasing step 416 is followed by a time up checking step 417. When the result of checking in the time up checking step 417 becomes "NO", the warming-up control routine 400 for this time is finished. The processing returns again to the warming-up checking step 300 via the other system controls routine 600. Thereafter, the series of the processing steps: the warming-up checking step 300, the appointed time checking step 401, the first time checking step 402, the engine start checking step 403, the engine-cranking stopping step 405, the easy air-conditioning control step 406, the proper temperature range checking step 407, the announcement step 408, the limited time flag checking step 409, the occupant checking step 415, the limited time data decreasing step 416 and the time up checking step 417, and the other system controls routine 600 are repeated to repeatedly decrease the value of the limited time data.

If a driver enters the car room during the repeated processing, the door signal generated by the door switch 5 actuated by the opening of the door of the car is supplied to the microcomputer 11. The microcomputer 11 is therefore interrupted to interrupt the repeated processing described above so that a door switch interrupt step 704 sets in. The door switch interrupt step 704 is followed by an "occupant-in" flag setting step 705 where an "occupant-in" flag is set. Then, a return step 706 is reached to terminate the door switch interrupt routine. Consequently, the arithmetic processing interrupted in FIG. 2 is resumed now.

As a result, when the occupant checking step 415 in the warming-up control routine 400 is reached, the result of checking in the step 415 is "YES" since the "occupant-in" flag has been set before so that the "un-warmed-up" flag clearing step 419 is reached to clear the "appointed time" flag and the "unwarmed-up" flag. Therefore, if the processing returns via the other system controls routine 600 to the warming-up checking step 300, the result of checking in the step 300 becomes "NO" since the "unwarmed-up" flag has been cleared in the previous "unwarmed-up" flag clearing step 419, so that the warming-up operation is finished and that a normal air-conditioning routine 500 is reached.

Thereafter, the loop of processing from the warming-up checking step 300 via the normal air-conditioning routine 500 and the other system controls routine 600 back to the warming-up checking step 300 is repeated until the car is brought to a halt. And the air-conditioning in the car room is controlled on the basis of the temperature and the operating mode set by the input manipulator on the input panel 4 and of the detected outputs of the room temperature sensor 7, the external temperature sensor 8 and the damper position sensor 9, in the normal air-conditioning routine 600 of the repeated processing.

On the other hand, if no driver enters the car room, that is, if there is no door switch interrupt occurring even after three minutes has passed corresponding to the limited time data set in the limited time data loading step 410 in the warming-up control routine 400, then the processing is repeated while the result of checking in the occupant checking step 415 continues to be "NO". As a result, the value of the limited time data becomes zero in the limited time data decreasing step 416 so that the result of checking in the time up checking step 417 is "YES" and the engine and air-conditioning stopping step 418 is reached. In the engine and air-conditioning stopping step 418, an engine stop command signal is supplied to the engine starting circuit 13 and simultaneously an air-conditioning stop command signal is supplied to the air-conditioning operating circuit 16. Accordingly, the operations of the compressor 17, the blower motor 18 and the engine 15 are stopped and the "unwarmed-up" flag clearing step 419 is reached.

Thus, the useless operations of the engine and the air-conditioner, which occur when the driver is away from the car after the engine and the air-conditioner have been operated in the automatic mode, can be prevented.

In the above described embodiment, the compressor is driven by the engine provided for driving the car itself. However, it may be, of course, driven by a subengine or a motor provided only therefor, or by an electric motor in the case of an electric automobile.

Moreover, instead of the programmable clock 3 used as a clocking means, a microcomputer which is always powered and which also has a function of automatically operating the air-conditioner may be used, the microcomputer executing the desired functions in accordance with the control program set therein.

Further, this invention can be successfully applied also to the air-conditioning in which only one of cooling and warming takes place.

Furthermore, in the described embodiment, the arithmetic processing is executed by a microcomputer using a software-dependant processing according to the control programs, but the same processing may be executed by a hardware device such as an electronic circuit.

In addition, although in the embodiment described above the operations of the engine and the air-conditioner are both started when a preset start time is reached, those operations may be started earlier by a certain time than the start of the drive of the car in order that the occupants, when getting on the car for drive, may feel comfortable.

Also, when the car is at rest with the engine shaft engaged with the wheel axle, it is necessary to cancel the above described automatic control by detecting the engagement via the transmission so as to prevent an accidental start of the car due to the automatic start of the engine according to the automatic control.

What is claimed is:

1. An apparatus for automatically air-conditioning a vehicle having an engine and an air-conditioner powered by said engine comprising:
   manually operable input means for generating a first input data signal representing a desired room temperature in said vehicle and a second input data signal representing an appointed time at which said vehicle is air-conditioned;
   room temperature sensor means for sensing the room temperature of said vehicle to generate an output signal representing the room temperature thereof;
   programmable clock means, responsive to said second input data signal, for generating a start signal when a time measured by said clock means coincides with said appointed time;
   means for controlling said air-conditioner; and
   a microcomputer having input terminals connected to said manually operable input means and said room temperature sensor means, an output terminal connected to said air-conditioner controlling means, and an interrupt request input terminal connected to said programmable clock means, said microcomputer being energized upon closing of a key switch of said engine for comparing the output signal of said room temperature sensor means with said first input data signal to operate said air-conditioner controlling means when a temperature difference between said room temperature and said desired room temperature exceeds a predetermined value, and said microcomputer being energized and interrupted in response to said start signal to execute an operation for comparing the output signal of said room temperature sensor means with said first input data signal to start said engine only when the temperature difference between said room temperature and said desired room temperature exceeds the predetermined value.

2. An apparatus for automatically air-conditioning a vehicle having an engine and an air-conditioner powered by said engine comprising:
   manually operable input means for generating a first input data signal representing a desired room temperature in said vehicle and a second input data signal representing an appointed time at which said vehicle is air-conditioned;
   room temperature sensor means for sensing the room temperature of said vehicle to generate an output signal representing the room temperature thereof;
   command means for generating a start command signal;
   means for controlling said air-conditioner; and
   control means connected to said input means, said sensor means, said command means and said air-conditioner controlling means, and including timer means for setting a predetermined time, said control means operating said air-conditioner controlling means in response to the start command signal from said command means where the output signal of said sensor means is outside of an appropriate temperature range for said room temperature, thereafter said control means operating said timer means when the room temperature comes in said appropriate temperature range, and said control means stopping the operation of said air-conditioner controlling means when the predetermined time set by said timer means elapses.

3. An apparatus according to claim 2, further comprising means connected to said control means, for sensing existence of an occupant in said vehicle to generate an output signal when an occupant is in said vehicle, said control means cancelling the stopping of the operation of said air-conditioner controlling means and continuing the operation thereof where said control means receives the output signal of said occupant existence sensing means before said predetermined time elapses.

4. An apparatus according to claim 3, wherein said occupant existence sensing means includes a door switch of said vehicle.

5. An apparatus according to claim 2, wherein said command means includes programmable clock means, responsive to said second input data signal, for generating said start command signal when a time measured by said clock means coincides with said appointed time.

6. A method for automatically air conditioning a vehicle having an engine and an air conditioner comprising the steps of:
   measuring a time to provide a time request indicative of the measured time being in excess of a desired time primarily programmed by a programmable clock means;
   sensing a temperature in said automative vehicle;
   discriminating, in response to said time request, whether the sensed temperature remains inside or outside a predetermined range of temperature;
   operating said engine, in response to the discrimination result indicative of the sensed temperature remaining outside said predetermined range of temperature, so that said engine produces the output power to operate said air-conditioner;
   after said engine is operated, starting operation of a timer when the sensed room temperature comes in said predetermined temperature range; and
   stopping said engine and said air-conditioner where no occupant gets in said vehicle from the time of starting of said engine to the time that a predetermined time set by said timer elapses.

7. A method according to claim 6, further comprising the steps of:
   repeating said sensing and discriminating steps; and
   preventing the operation of said engine where the discrimination result at the first time of said discriminating steps indicates that the sensed temperature remains inside said predetermined range of temperature.

8. A method for automatically air conditioning a vehicle having an engine and an air conditioner comprising the steps of:
giving a start command signal for starting control operation;
sensing a temperature in said automotive vehicle;
discriminating, in response to said start command signal, whether the sensed temperature remains inside or outside a predetermined range of temperature;
operating said engine, in response to the discrimination result indicative of the sensed temperature remaining outside said predetermined range of temperature, so that said engine produces the output power to operate said air-conditioner;
after said engine is operated, starting operation of a timer when the sensed room temperature comes in said predetermined temperature range; and
stopping said engine and said air-conditioner where no occupant gets in said vehicle from the time of starting of said engine to the time that a predetermined time set by said timer elapses.

* * * * *